(12) United States Patent
Nordström et al.

(10) Patent No.: US 9,426,814 B2
(45) Date of Patent: Aug. 23, 2016

(54) RADIO BASE STATION AND A METHOD THEREIN FOR SCHEDULING RADIO RESOURCES BASED ON A PATH LOSS FRACTION

(75) Inventors: Björn Nordström, Stockholm (SE); Ying Sun, Sundbyberg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 322 days.

(21) Appl. No.: 14/003,359

(22) PCT Filed: Mar. 11, 2011

(86) PCT No.: PCT/SE2011/050267
§ 371 (c)(1),
(2), (4) Date: Sep. 5, 2013

(87) PCT Pub. No.: WO2012/125087
PCT Pub. Date: Sep. 20, 2012

(65) Prior Publication Data
US 2013/0343321 A1   Dec. 26, 2013

(51) Int. Cl.
*H04W 72/08* (2009.01)
*H04W 72/12* (2009.01)
(Continued)

(52) U.S. Cl.
CPC ....... *H04W 72/085* (2013.01); *H04W 72/1226* (2013.01); *H04W 24/00* (2013.01); *H04W 48/16* (2013.01); *H04W 88/08* (2013.01)

(58) Field of Classification Search
CPC . H04W 24/00; H04W 48/16; H04W 72/085; H04W 72/1226; H04W 88/08
See application file for complete search history.

(56) References Cited

U.S. PATENT DOCUMENTS 8,811,367 B2 * 8/2014 Nelson, Jr. et al. .......... 370/342
2007/0042784 A1   2/2007 Anderson
(Continued)

FOREIGN PATENT DOCUMENTS

EP  1734778 A1  12/2006
EP  1887709 A1   2/2008
(Continued)

OTHER PUBLICATIONS

Unknown, Author. "3rd Generation Partnership Project; Technical Specification Group Radio Access Network; Evolved Universal Terrestrial Radio Access (E-UTRA); Physical Channels and Modulation (Release 9)." 3GPP TS 36.211 V9.1.0. Mar. 2010.
(Continued)

*Primary Examiner* — Jianye Wu
(74) *Attorney, Agent, or Firm* — Murphy, Bilak & Homiller, PLLC (57) ABSTRACT

A radio base station and a method therein are provided for scheduling a radio resource to a user equipment. The radio base station estimates a first channel quality and determines a pathloss between the user equipment and the serving radio base station and a gain based on the pathloss. The radio base station also obtains a gain of the user equipment towards of neighboring radio base stations, and determines a fraction of the determined pathloss, based on the gain and the obtained gains. The radio base station further determines a second channel quality of the channel based on the estimated first channel quality, the determined fraction and the determined pathloss to be compensated for; and schedules a radio resource for the user equipment based on the determined second channel quality.

8 Claims, 5 Drawing Sheets

(51) Int. Cl.
*H04W 24/00* (2009.01)
*H04W 48/16* (2009.01)
*H04W 88/08* (2009.01)

(56) References Cited

U.S. PATENT DOCUMENTS

| | | | |
|---|---|---|---|
| 2008/0188260 A1* | 8/2008 | Xiao et al. | 455/522 |
| 2008/0205333 A1 | 8/2008 | Budianu et al. | |
| 2010/0135236 A1 | 6/2010 | Wang et al. | |
| 2011/0014926 A1* | 1/2011 | Baligh et al. | 455/452.2 |
| 2011/0300873 A1* | 12/2011 | Wen et al. | 455/450 |
| 2012/0008489 A1* | 1/2012 | Higuchi et al. | 370/203 |
| 2012/0082041 A1 | 4/2012 | Damnjanovic et al. | |
| 2012/0129562 A1* | 5/2012 | Stamoulis et al. | 455/517 |
| 2013/0029706 A1 | 1/2013 | Sachs et al. | |
| 2013/0215784 A1* | 8/2013 | Nordstrom et al. | 370/252 |

FOREIGN PATENT DOCUMENTS

| | | |
|---|---|---|
| EP | 2096807 A1 | 9/2009 |
| WO | 2006133023 A2 | 12/2006 |
| WO | 2008050230 A2 | 5/2008 |
| WO | 2008130297 A1 | 10/2008 |
| WO | 2008135101 A1 | 11/2008 |
| WO | 2008156417 A2 | 12/2008 |

OTHER PUBLICATIONS

Feng, Minghai et al, "Coordinated Scheduling Based on Overload Indicator for LTE/LTE-A Uplink," Vehicular Technology Conference Fall 2010 IEEE 72nd, pp. 1-5, 6-9. Section III A. Sep. 2010.

Catt: "Signalling Information for Node-B Controlled Uplink Scheduling and Text Proposal for TR 25.827", 3GPP TSG RAN WG1 #46, Tallinn, Estonia, R1-062419, Section 2.

IPWireless: "Uplink IoT management using only serving-cell Uu control", 3GPP TSG RAN WG1 #48bis, St. Julian, Malta, R1-071274, Mar. 26, 2007, Section 1.

Rahman, M. et al, "Inter-Cell Interference Coordination in OFDMA Networks: A Novel Approach Based on Integer Programming," Vehicular Technology Conference Spring 2010, IEEE 71st, pp. 1-5, 16-19. Section III. May 2012.

* cited by examiner

RADIO BASE STATION AND A METHOD THEREIN FOR SCHEDULING RADIO RESOURCES BASED ON A PATH LOSS FRACTION

TECHNICAL FIELD

Embodiments herein relate to a radio base station and a method therein. Particular embodiments herein relate to scheduling a radio resource in a radio communications network.

BACKGROUND

In today's radio communications networks a number of different technologies are used, such as Long Term Evolution (LTE), LTE-Advanced, 3rd Generation Partnership Project (3GPP) Wideband Code Division Multiple Access (WCDMA) system, Global System for Mobile communications/Enhanced Data rate for GSM Evolution (GSM/EDGE), Worldwide Interoperability for Microwave Access (WiMax), or Ultra Mobile Broadband (UMB), just to mention a few.

LTE is a Frequency Division Multiplexing technology wherein Orthogonal Frequency Division Multiplexing (OFDM) is used in downlink (DL) transmissions from a radio base station to a user equipment (UE). Single Carrier-Frequency Domain Multiple Access (SC-FDMA) is used in uplink (UL) transmissions from the user equipment to the radio base station. Services in LTE are supported in the packet switched domain.

In a time domain, according to LTE, one subframe of 1 ms duration is divided into 12 or 14 OFDM, or SC-FDMA, symbols, depending on a configuration of the subframe. One OFDM or SC-FDMA symbol comprises a number of sub carriers in the frequency domain, depending on a channel bandwidth and configuration. One OFDM or SC-FDMA symbol on one sub carrier is referred to as a Resource Element (RE).

In LTE no dedicated data channels are used, instead shared channel resources are used in both downlink and uplink. These shared resources, Downlink Shared Channel (DL-SCH) and Uplink Shared Channel (UL-SCH), are each controlled by one scheduler in the radio base station, which scheduler assigns different parts of the downlink and uplink shared channels to different user equipments for reception and transmission, respectively.

The schedulers are in full control of in which subframe a user equipment should receive a DL-SCH transmission and which subframe the user equipment is allowed to transmit on the UL-SCH. Scheduling decisions are sent to the user equipment as downlink assignments and uplink grants. Downlink assignment information and uplink grants are transmitted in Downlink Control Information (DCIs) using Layer 1/Layer 2 control signalling. A downlink assignment message indicates if there is data to be received for the user equipment on the DL-SCH.

Dynamic scheduling enables multiple user equipments to share all, or parts of, available frequency resources in one subframe; all, or parts of, frequency resources are assigned to one user equipment; and no user equipments are allocated any frequency resources.

A resulting resource allocation over time and frequency depends both on properties of the user equipments in the system, i.e. the number of user equipments, traffic models of the user equipments, radio channel characteristics, and on an algorithm implementing a scheduling functionality. A strategy defining in which way resources in time and frequency are allocated to a set of user equipments is commonly referred to as a scheduling algorithm.

Scheduling algorithms that prioritize users which have a good channel or radio condition perform so called channel dependent scheduling. Channel dependent scheduling utilizes the multi user diversity, where multiple users are spread out in the cell and thus experience different channel quality dips at different frequencies and at different times. For example, a pure channel dependent scheduling algorithm typically prioritizes the mobile terminal which has a good channel or radio condition. As a result, the cell throughput will be maximized, however with the cost of starving mobile terminals having bad channel conditions. Channel dependent scheduling is therefore said to be unfair.

Proportional fair (PF) scheduling adds control of an overall fairness in the radio communications network by prioritizing user equipments not only based on a channel quality of the user equipment but also on an average rate of a transmission. The overall fairness of the scheduling is controlled by steering a proportion of the two factors, i.e. instantaneous channel quality and an average rate of transmission. The PF scheduling strategy is able to utilize channel variations to improve overall cell throughput while still ensuring reasonable fairness between UEs.

As previously described, LTE enables dynamic scheduling where resources are orthogonal in the frequency domain, thus enabling channel dependent scheduling to be used in both time and frequency. Prioritizing which resources in the frequency domain that should be allocated to a UE is called Frequency Selective Scheduling (FSS). If applied in an LTE scenario, an optimal frequency selective scheduler would only assign resources to a UE where its channel quality is high. The channel quality may be estimated in the radio base station based on UE reported CQI and/or reception of uplink reference signals.

One way of implementing FSS is to employ proportional fair scheduling, where the channel quality measure is based on variations in both time and frequency, that is, proportional fair in time and frequency. PF in time and frequency is believed to ensure higher cell throughput and fairness among UEs.

Frequency selective scheduling algorithms of today require immense computation power to find an optimized solution. One example of such solutions is to compute/determine the number of bits as a measure of the channel quality. That requires performing link adaptation before making a scheduling decision which is associated with very high computational complexity. A simple channel quality metric is crucial to realize frequency selective scheduling in practice. Examples of channel quality measures, which are more feasible for implementation, are Gain to Interference and Noise Ratio (GINR) or Signal to Interference and Noise Ratio (SINR). However, methods using both these typical channel quality measures have associated problems. Using GINR, the scheduler in the radio base station tends to favour UEs in a centre of the cell. SINR is a good channel quality measure, but it is difficult to estimate SINR before knowing where and how many resource blocks are allocated.

SUMMARY

It is an object of the embodiments to address at least some of the problems outlined above. In particular, it is an object of the invention to provide a radio base station and a method therein for scheduling a radio resource to a user equipment, wherein consideration is taken to both pathloss between the user equipment and the serving base station and to gain between the user equipment towards neighbouring radio base stations. These objects and others may be obtained by providing a radio base station and a method therein according to the independent claims attached below.

According to an aspect, a method in a serving radio base station is provided for scheduling a radio resource to a user equipment, the method comprising estimating a first channel quality of a channel used by the user equipment, determining a pathloss between the user equipment and the serving radio base station and determining a corresponding gain based on the determined pathloss. The method further comprises obtaining a gain of the user equipment towards each of a number of neighbouring radio base stations. Still further, the method comprises determining a fraction of the determined pathloss between the user equipment and the serving radio base station to be compensated for, based on the determined gain of the user equipment towards the serving radio base station and the obtained gains. The method also comprises determining a second channel quality of the channel based on the estimated first channel quality, the determined fraction and the determined pathloss to be compensated for; and scheduling a radio resource for the user equipment based on the determined second channel quality.

According to an aspect, a radio base station is provided adapted to schedule a radio resource to a user equipment. The radio base station is configured to estimate a first channel quality of a channel used by the user equipment and to determine a pathloss between the user equipment and the serving radio base station and further configured to determine a corresponding gain based on the determined pathloss. The radio base station is further configured to obtain a gain of the user equipment towards each of a number of neighbouring radio base stations and to determine a fraction of the determined pathloss between the user equipment and the serving radio base station to be compensated for, based on the determined gain of the user equipment towards the serving radio base station and the obtained gains. Still further, the radio base station is configured to determine a second channel quality of the channel based on the estimated first channel quality, the determined fraction and the determined pathloss. The radio base station is also configured to schedule a radio resource for the user equipment based on the determined second channel quality.

The radio base station and the method therein have several advantages. The cell dependent fraction of pathloss compensation used in the scheduler to prioritise UEs takes into account possible cell interference generated to the other cells. The radio base station and the method therein also take into account the end user quality of service fairness requirements aspects so that the scheduler schedules with more fairness. Furthermore, the inter cell interference power is minimised in the scheduler by scheduling the worst interfering user equipments less frequently, but if possible more efficiently. The radio base station and the method therein allow the scheduler to either optimise performance based on its own purpose or perform in a more neighbouring friendly fashion so that the total system performance may benefit in a more realistic irregular network.

BRIEF DESCRIPTION OF DRAWINGS

Some possible embodiments will now be described in more detail with reference to the accompanying drawings, in which.

DETAILED DESCRIPTION

Figure 1:
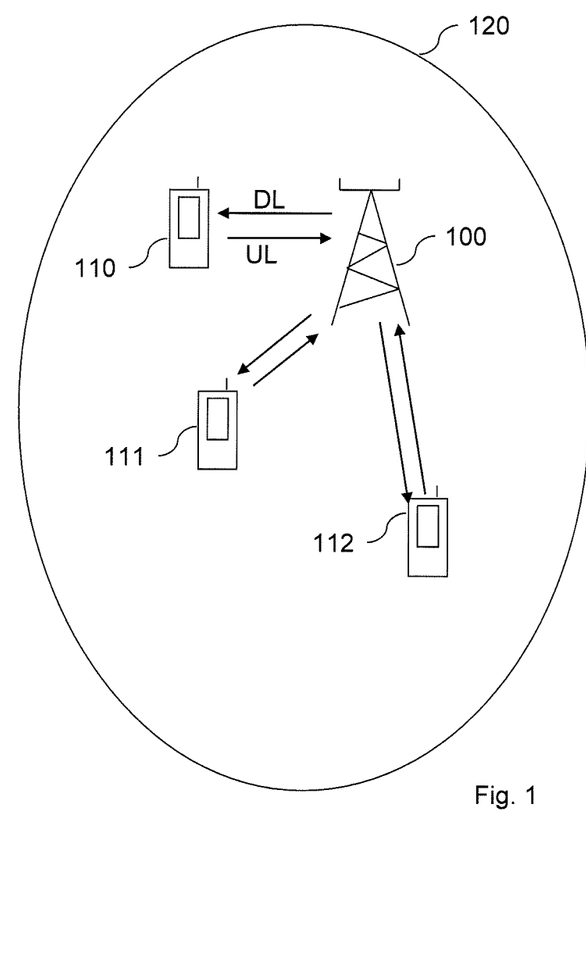
FIG. 1 is a schematic overview of a radio communications network.

FIG. 1 provides a general overview of a radio communications network. The radio communications network may be a network according to a standard, such as a Long Term Evolution (LTE), LTE-Advanced, 3rd Generation Partnership Project (3GPP) Wideband Code Division Multiple Access (WCDMA) system, Global System for Mobile communications/Enhanced Data rate for GSM Evolution (GSM/EDGE), Worldwide Interoperability for Microwave Access (WiMax), or Ultra Mobile Broadband (UMB), just to mention a few possible options.

In the radio communication network, a first user equipment 110 is communicating with a radio base station 100 by transmitting data to the radio base station 100. The data is transmitted from the first user equipment 110 to the radio base station 100 in an uplink (UL) transmission, wherein the first user equipment 110 transmits data using a certain transmission power. Data transmitted from the radio base station 100 to the first user equipment 110 is referred to as a downlink (DL) transmission. Also a second user equipment 111 is served by the radio base station 100 as well as a third user equipment 112. The radio base station 100 controls a cell 120, in which the first, second and third user equipment 110,111,112 are served. The cell 120 provides radio coverage over a geographical area.

It should here be mentioned that the radio base station 100 may also be referred to as e.g. a NodeB, an evolved Node B (eNB, eNode B), a base transceiver station, Access Point Base Station, base station router, or any other network unit capable to communicate with a user equipment within the cell 120 served by the radio base station 100, depending e.g. of the radio access technology and terminology used. Each user equipment 110,111,112 may e.g. be represented by a wireless communication terminal, a mobile cellular phone, a Personal Digital Assistant (PDA), a wireless platform, a laptop, a computer or any other kind of device capable to communicate wirelessly with the radio base station 100.

The radio base station 100 comprises a scheduling algorithm to provide a spectrum efficient and fair scheduling of radio resources controlled by the radio base station 100. A radio resource may be a resource element, a resource block, or any resource enabling communication between the radio base station 100 and the user equipment 110.

According to embodiments herein, the scheduling algorithm takes the pathloss between the user equipments 110, 111,112 and the radio base station 100 into consideration. Thereby, the spatial component, i.e. the pathloss, is removed fully or partly from the channel quality measurement of the user equipments 110,111,112. Thus, the radio base station 100 may schedule one or more radio resources to the different user equipments 110,111,112 based on a channel quality that has been computed based on pathloss. The radio base station 100 may further schedule a radio resource to the user equipments 110,111,112 further based on a rate of a transmission from respective user equipment 110,111,112. Hence, embodiments herein disclose a scheduling that may prioritize a user equipment based on a combination of the channel quality of the channel used by the user equipment and the rate of transmission over the channel, which channel quality has been determined/computed using pathloss as a parameter.

Further according to embodiments herein, consideration is also taken to the cell deployments, which may be more or less inhomogeneous. For example, conditions such as cell size, traffic distribution and interference isolation are typically different in different cells. A cell might introduce interference to its neighbouring cells, by prioritizing cell edge users which require high transmission power. But for a cell which is well isolated from the neighbouring cells, such as e.g. indoor scenarios, cell edge users might be less prioritized and this will reduce the cell edge user throughput.

Figure 2:
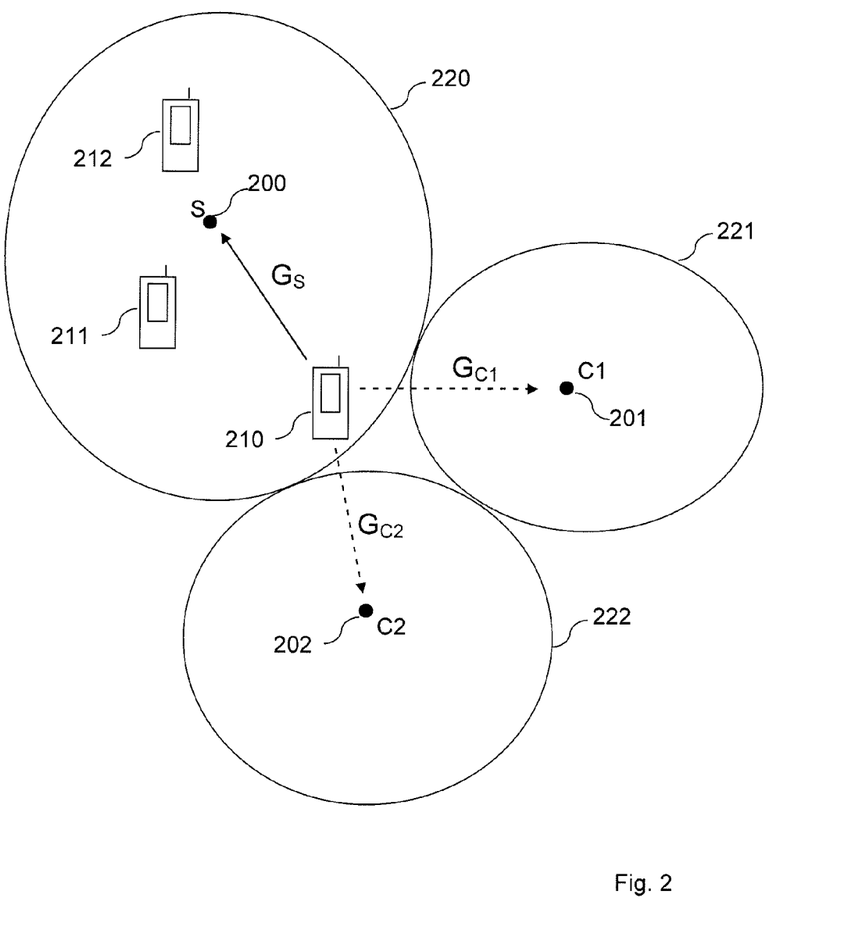
FIG. 2 is a schematic overview of a radio communications network.

FIG. 2 illustrates three cells in a radio communications network, a serving cell 220 and two neighbouring cells 221, 222. FIG. 2 also illustrates three user equipments 210, 211, 212 being served by a base station 200 in cell 220. A first user equipment 210 is illustrated having a gain $G_S$ towards the serving base station 200, and also a gain $G_{C1}$ and $G_{C2}$ towards base stations C1 and C2 respectively. It shall be noted here that a gain, G, is determined based on the pathloss. For example, the gain G comprises the inverse of a corresponding pathloss, PL, or the gain G in general is a function of the inverse of the pathloss (1/PL) such that G~1/PL. It may be then be seen in FIG. 2 that the first user equipment 210 may cause some interference in the neighbouring cells C1 and C2. Cells C1 and C2 may each be serving a number of user equipments, not shown in FIG. 2.

An exemplifying method in a serving radio base station for scheduling a radio resource to a user equipment, will now be described with reference to the flow chart of FIG. 3. The serving radio base station is comprised in a radio communications network and controls a number of radio resources to be scheduled for communication to a number of user equipments. The scheduling is based on channel quality of channels used by the respective user equipments.

Figure 3:
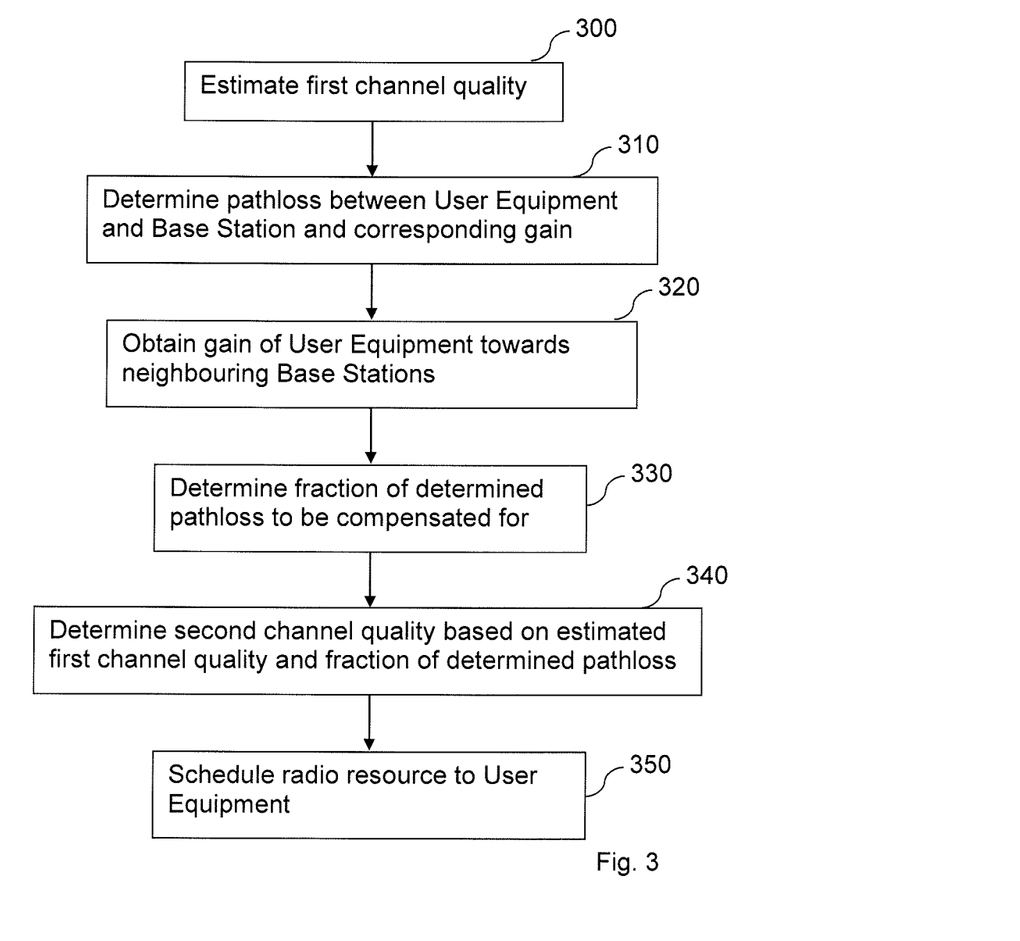
FIG. 3 is a flowchart of an exemplifying method in a radio base station.

The different actions in FIG. 3 may be performed in any suitable order.

It shall be noted that various events may have taken place before the shown method starts executing, but these possible events are not necessary to describe in detail here and are thus omitted in FIG. 3 for simplicity reasons.

An example of such possible events is that the first user equipment wishes to transmit data and therefore sends a request for scheduling a transmission in an uplink transmission. The request may be any transmission request such as a Scheduling Request (SR) or the like. Then a possible subsequent event is that the user equipment may send a buffer status report indicating an amount of data to be transmitted or an indication of a rate of bits to be communicated over the channel. Yet an example of a possible event is that the user equipment may send a pathloss indication to the radio base station with a certain periodicity. For example, the user equipment may send power headroom reports to the radio base station. The power headroom report provides a measure of how close a transmit power spectral density (PSD) of the user equipment is to a maximum PSD limit, i.e. indicating the pathloss. The maximum PSD limit may be derived from a maximum user equipment transmit power, e.g. in the order of 24 dB, and a minimum bandwidth, e.g. 1 Physical Resource Block (PRB).

FIG. 3 illustrates the exemplifying method comprising estimating 300 a first channel quality used by the user equipment by e.g. determining a GINR of the channel. The GINR may be determined based on a measured received power at the radio base station and a transmission power used at the user equipment to transmit over the channel. This transmission power may be reported from the user equipment or otherwise retrieved from within the radio base station. Also interference and noise are parts considered in the calculation of GINR. Other channel quality indications may be used as well such as Gain to Interference Ratio (GIR), Carrier to Interference (C/I), SINR or the like.

The method further comprises determining 310 the pathloss from the user equipment towards the radio base station and determining a corresponding gain based on the determined pathloss. For example, the radio base station may determine the pathloss based on an indication received from the user equipment in e.g. a received power headroom report or the like.

Still further, the method comprises obtaining 320 a gain of the user equipment towards each of a number of neighbouring radio base stations. As stated above, the gain comprises the inverse of the pathloss. For example, obtaining a gain of the user equipment towards each of the neighbouring radio base stations may be based on e.g. a report from the user equipment regarding the received Reference Signal Received Power, RSRP, from each of the neighbouring base stations.

The method also comprises determining 330 a fraction of the determined pathloss between the user equipment and the serving radio base station to be compensated for, based on the determined gain of the user equipment towards the serving radio base station and the obtained gains towards the neighbouring radio base stations, respectively.

The method comprises determining 340 (or computing) a second channel quality of the channel based on the estimated first channel quality, the determined fraction, and the determined pathloss to be compensated for. The second channel quality, also referred to as a compensated first channel quality, may be determined based on estimated GINR with compensated pathloss as follows:

$$GINR_{comp} = GINR_{est} + \tau * PL, \text{ where} \quad (1)$$

$GINR_{comp}$ is the second channel quality defined as compensated GINR in dB,
$GINR_{est}$ is the estimated first channel quality defined as estimated GINR in dB,
PL is pathloss in dB, and
$\tau$ is a fractional indicator parameter.

The purpose is to partly or fully remove the spatial component from the user equipment's channel quality measure, which is done by adding pathloss to the channel quality. By removing the spatial component, a fast channel quality variation in time and frequency may be utilized in channel dependent scheduling. The parameter $\tau$ controls the fraction of the pathloss that should be compensated. This fraction of the pathloss controls the degree of fairness between different user equipments in the cell, when using a channel dependent scheduling algorithm.

The setting of $\tau$ will be reflected in the scheduler's prioritization of users in the cell. If $\tau$ is set to one, the channel quality component of a cell edge user varies in the same range as that of a user equipment at the cell center. This leads to a higher degree of fairness in the cell between user equipments at the cell center and at the cell edge.

In addition, the setting of $\tau$ also controls the utilization of fast channel variations in user equipment prioritization and the average transmitted power of a user equipment. A smaller value of $\tau$ implies that a user equipment that has a larger pathloss may only be prioritized when it has a relatively high channel quality. In time, the high path loss user equipment will be scheduled less frequent. But that user equipment will be scheduled in the most spectrum efficient occasions. To transmit the same number of bits, the average transmit power will be lower, implying a lower average of inter-cell interference.

The method further comprises scheduling 350 a radio resource for the user equipment based on the determined second channel quality.

According to an embodiment, determining 330 a fraction of the determined pathloss between the user equipment and the serving radio base station comprises determining the fraction according to $$\tau_s = \frac{\sum_{i=1}^{M_s} G_{i,s}}{\sum_{j=1}^{N} \sum_{i=1}^{M_s} G_{i,j}} * F, \quad (2)$$

where $G_{i,s}$ is the gain between the user equipment of interest i and the serving base station s, $M_s$ is a current number of user equipments in the serving cell served by the base station, $G_{i,j}$ is the gain between the user equipment of interest i and the radio base station j in the system including the serving base station s, N is the number of cells and F is a preset fairness factor.

Looking again at FIG. 2, assuming user equipment 210 is located close to the cell edge of cell 220, the interference generated towards or in cells 221 and 222 from the transmission of the user equipment 210 in cell 220 will depend on the values of the respective gains, $G_{C1}$ and $G_{C2}$ towards base stations C1 with reference number 201 and C2 with reference number 202. The generated interference will also depend on the transmission power of the user equipment 210. If the user equipment 210 is located close to the cell edge, then $G_S$ will be relatively low, the transmit power will be high and $G_{C1}$ and $G_{C2}$ will be relatively high. Thus, transmissions from the user equipment 210 will generate a high interference level in cells 221 and 222. From an interference perspective, the user equipment should in that case be scheduled less often.

Considering these aspects, the interference situation in the system may be improved or optimized by calculating a cell specific setting, $\tau_s$, based on measurements of the pathloss from the user equipments in the cell 220 towards the receiver of the serving cell and the pathloss towards receivers in the other cells in the system. An example of calculating $\tau_s$ is given above in equation (2).

The first part of the equation (2) above, that is the fraction part, represents a cell geometry. It is the ratio between the gain in the serving cell and the total contribution that includes both the gain in the serving cell, i.e. useful power, and the cost in the neighbouring cells, i.e. interference. By introducing a cell geometry component to the pathloss compensation fraction, the scheduler is able to control the fairness based on the current cell interference situation so that the prioritization of the user equipments becomes cell dependent.

The second part of the equation (2) above, i.e. the fairness factor F, has a preset value which is determined or defined by the operator.

In an example, the value of $\tau_s$ is calculated statistically for each cell. This is performed e.g. by an Operation, Administration and Maintenance (OAM) Subsystem. The pathloss to the serving base station may be measured by a user equipment and reported to the serving radio base station by means of a Power Headroom Report (PHR). In order to obtain the pathloss in the neighbouring cells, the radio base station requests in an example the user equipments to report the received RSRP from the neighbouring radio base stations. In the OAM subsystem, the pathloss of a user equipment to the neighbouring radio base stations is calculated e.g. based on internal knowledge of the transmission power of the neighbouring radio base stations. $\tau_s$ is then be calculated accordingly and updated on a slow basis in the OAM subsystem and sent to the scheduling module of the radio base station.

According to an embodiment, determining 330 a fraction of the determined pathloss between the user equipment and the serving radio base station comprises determining the fraction based on geometry of the user equipment i and comprises calculating the fraction, $\tau_s^i$, as $$\tau_s^i = \frac{G_{i,s}}{\sum_{j=1}^{N} G_{i,j}} * F, \quad (3)$$

where $G_{i,s}$ is the gain between the user equipment of interest i and the serving base station s, $G_{i,j}$ is the gain between the user equipment of interest i and the base station j in the system including the serving cell s, N is the number of cells in the system and F is a fairness factor.

$\tau_s^i$ in (3) is the geometry of user i which has the serving cell s. The scheduler then prioritizes user equipments based on the channel quality measure which is compensated for pathloss, where the magnitude of the compensation is user equipment specific.

According to an embodiment, estimating 300 the first channel quality comprises estimating a first gain to interference and noise ratio, $GINR_{est}$ of the channel used by the user equipment. Further, determining 340 a second channel quality of the channel comprises determining a second gain to interference and noise ratio, $GINR_{comp}$ based on the estimated $GINR_{est}$, the determined fraction and the determined pathloss to be compensated for according to $GINR_{comp}=GINR_{est}+\text{fraction}*\text{pathloss}$.

Turning back to FIG. 3, after scheduling 350 a radio resource to the first user equipment out of the number of radio resources, several events may take place which are not illustrated in FIG. 3. In an example, the radio base station transmits information regarding the scheduled radio resource. The information may be sent in Downlink Control information (DCI) from the radio base station. For an UL transmission, a bandwidth resource assigned to a user equipment may always be a set of contiguous scheduling blocks (SBs) due to the constraints of the SC-FDMA transmission scheme. The radio resource or resources are indicated in the DCI by a start scheduling block (SB) and an allocation size in a number of SBs for UL. LTE supports full dynamic scheduling, which means that the radio resource assigned to the UE is set to be valid only for one subframe. In a next subframe, the same radio resource may be allocated to a different user equipment. Thus, the radio base station may send an uplink (UL) grant to the user equipment. The uplink grant assigns uplink resources to transmission from the user equipment. In still an example, the user equipment then transmits data such as uplink data on the scheduled or assigned radio resources.

In order to perform the exemplifying methods described above, a radio base station adapted to schedule a radio resource to a user equipment may be provided. An exemplifying radio base station will now be described with reference to FIG. 4 which is a block diagram of an embodiment of a radio base station 400. The radio base station may be used to realize the same objects and advantages as the method described above. The radio base station of FIG. 4 will therefore be described more briefly to avoid unnecessary repetition.

Figure 4:
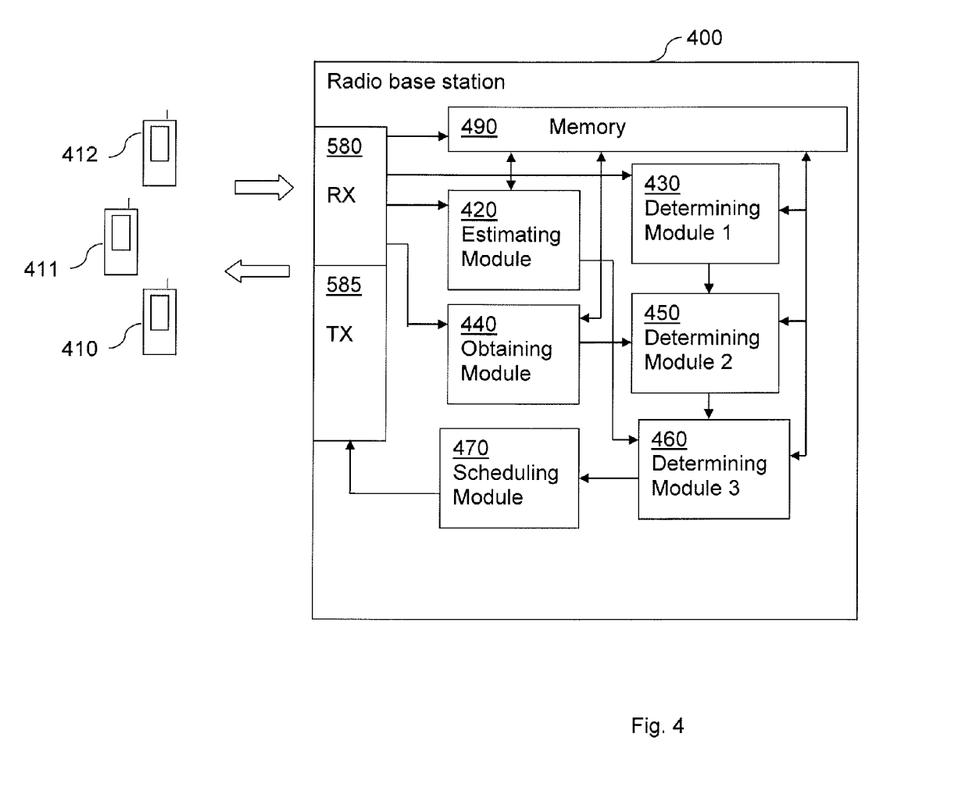
FIG. 4 is a block diagram of an exemplifying radio base station.

The radio base station 400 is arranged to be comprised in a radio communications network and to control a plurality of radio resources to be scheduled for communication to a plurality of user equipments 410, 411, 412. The plurality of user equipments comprises the user equipment 410 and is served by the radio base station 400. The radio base station 400 is arranged to schedule radio resources based on channel quality of channels used by the respective user equipments 410, 411, 412. The radio base station 400 is configured to estimate 420 a first channel quality of a channel used by the user equipment 410. In some embodiments, the radio base station 400 may comprise a receiving arrangement 480 and an estimating module 420 configured to estimate the first channel quality based on a measurement on a signal received at the receiving arrangement 480.

The radio base station 400 is further configured to determine 430 a pathloss between the user equipment 410 and the serving radio base station 400 and further configured to determine a corresponding gain based on the determined pathloss. The pathloss may be based on an indication of the pathloss received from the user equipment 410, such as a received power measurement or calculated pathloss, over the receiving arrangement 480 or stored at the radio base station 400.

Furthermore, the radio base station 400 is configured to obtain 440 a gain of the user equipment towards each of a number of neighbouring radio base stations. For example, obtaining a gain of the user equipment towards each of a number of neighbouring radio base stations may be based on e.g. a report from the user equipment regarding the received Reference Signal Received Power, RSRP, from each of the neighbouring base stations.

Still further, the radio base station 400 is configured to determine 450 by means of determining module a fraction of the determined pathloss between the user equipment and the serving radio base station to be compensated for based on the determined gain of the user equipment towards the serving radio base station and the obtained gains.

Furthermore, the radio base station 400 is configured to determine 460 a second channel quality of the channel based on the first channel quality and the determined fraction and the determined pathloss. The radio base station 400 is further arranged to schedule 470 a radio resource for the user equipment 410 based on the determined second channel quality.

The radio base station 400 may then be configured to transmit scheduling information, for example, DCI, to the user equipment 410 over a transmitting arrangement TX 485.

The radio base station may further comprise a memory 490 comprising one or more memory units. The memory is arranged to be used to store data such as estimates, pathlosses, channel qualities, schedulings, and applications to perform the methods herein when being executed in the radio base station 400.

FIG. 4 illustrates various functional modules 420-470 as an exemplifying embodiment of a radio base station. It should be noted that FIG. 4 merely illustrates the various functional modules in the radio base station in a logical sense. The functions in practice may be implemented using any suitable software and hardware means/circuits etc. Thus, the invention is generally not limited to the shown structures of the radio base station and the functional modules. Hence, the previously described exemplary embodiments may be realised in many ways.

Figure 5:
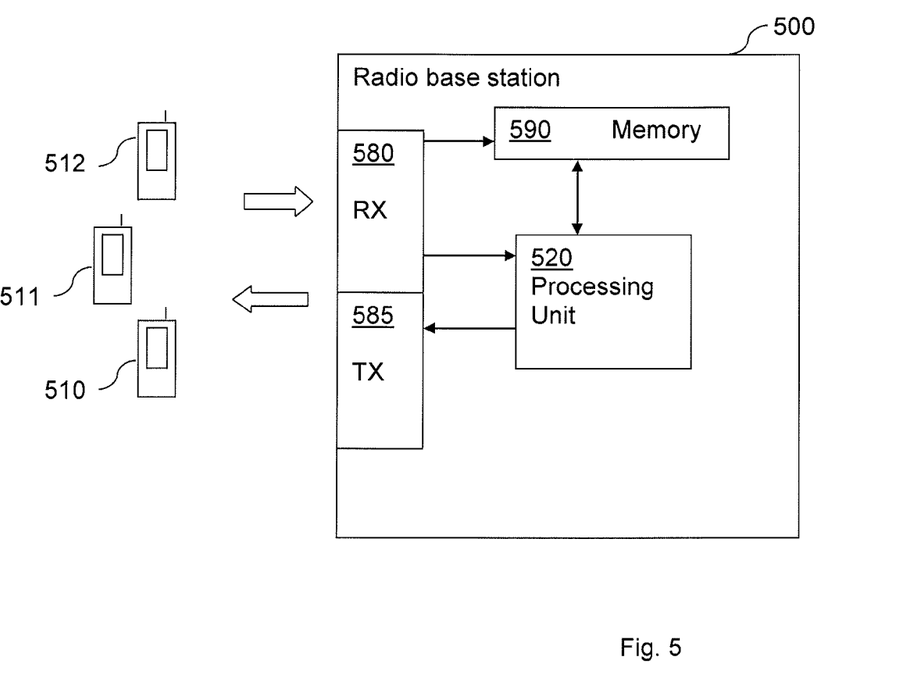
FIG. 5 is a block diagram of an exemplifying radio base station.

The present mechanism for scheduling a radio resource to the user equipment 410 may be implemented through one or more processors, such as a processing unit, comprising some or all of the modules 420-470, in the radio base station 400 depicted in FIG. 4, together with computer program code for performing the functions of the embodiments herein. Such an embodiment is schematically illustrated in FIG. 5 having a processing unit 520 configured to perform the functions of the modules 420-470 in FIG. 4. A seen the modules comprise estimating module 420, determining modules 430, 450 and 460; obtaining module 440 and scheduling module 470. These respective modules perform the respective method steps in accordance with the embodiments of the present invention.

For example, one embodiment of the present invention includes a computer-readable medium having instructions stored thereon that are executable by the radio base station for performing the method. The instructions executable by a computing system and stored on the computer-readable medium perform the method steps of the present invention as set forth in the claims. One such computer-readable medium may be in the form of a CD ROM disc. It is however feasible to use other types of data carriers such as a memory stick. The computer program code may furthermore be provided as pure program code on a server and downloaded to the radio base station 400.

While the present invention has been described in terms of several embodiments, it is contemplated that alternatives, modifications, permutations and equivalents thereof will become apparent upon reading of the specifications and study of the drawings. It is therefore intended that the following appended claims encompass such alternatives, modifications, permutations and equivalents as fall within the scope of the present invention and defined by the pending claims.

The invention claimed is:

1. A method in a serving radio base station for scheduling a radio resource to a user equipment, the method comprising:

estimating a first channel quality of a channel used by the user equipment;

determining a pathloss between the user equipment and the serving radio base station and determining a corresponding gain based on said determined pathloss;

obtaining a gain of the user equipment towards each of a number of neighboring radio base stations;

determining a fraction of the determined pathloss between the user equipment and the serving radio base station to be compensated for, based on the determined gain of the user equipment towards the serving radio base station and the obtained gains;

determining a second channel quality of the channel based on the estimated first channel quality, the determined fraction and the determined pathloss to be compensated for; and scheduling a radio resource for the user equipment based on the determined second channel quality;

wherein said determining a fraction of the determined pathloss between the first user equipment and the serving radio base station, comprises determining said fraction according to:

$$\tau_s = \frac{\sum_{i=1}^{M_s} G_{i,s}}{\sum_{j=1}^{N}\sum_{i=1}^{M_s} G_{i,j}} * F,$$

where $G_{i,s}$ is said gain between said user equipment of interest i and said serving base station s; $M_s$ is a number of user equipments in the serving cell served by the serving base station; $G_{i,j}$ is said gain between the user equipment of interest i and the radio base stations j, including the serving base station s; N is the number of cells; and F is a preset fairness factor.

2. The method of claim 1, wherein said obtaining a gain comprises obtaining from the user equipment the gain of the user equipment and each of a number of neighboring radio base stations in a report comprising a received Reference Signal Received Power (RSRP) from each of the neighboring base stations.

3. The method of claim 1, wherein said determining a fraction of the determined pathloss between the first user equipment and the serving radio base station, comprises determining said fraction based on geometry of the user equipment i, said gain is determined according to:

$$\tau_s^i, \tau_s^j = \frac{G_{i,s}}{\sum_{j=1}^{N} G_{i,j}} * F,$$

where $G_{i,s}$ is said gain between the user equipment of interest i and the serving base station s; $G_{i,j}$ is said gain between the user equipment of interest i and the radio base stations j, including the serving base station s; N is the number of cells; and F is a fairness factor.

4. The method of claim 1, wherein said estimating first channel quality comprises estimating a first gain to interference and noise ratio, $GINR_{est}$, of the channel used by the user equipment, and wherein determining a second channel quality of the channel comprises determining a second gain to interference and noise ratio, $GINR_{comp}$, based on the estimated $GINR_{est}$, the determined fraction and the determined pathloss to be compensated for, according to:

$GINR_{comp} = GINR_{est} + \text{fraction} * \text{pathloss}.$

5. A radio base station adapted to schedule a radio resource to a user equipment, wherein the radio base station is:
configured to estimate a first channel quality of a channel used by the user equipment,
configured to determine a pathloss between the user equipment and the serving radio base station and further configured to determine a corresponding gain based on said determined pathloss;
configured to obtain a gain of the user equipment towards each of a number of neighboring radio base station;
configured to determine a fraction of the determined pathloss between the user equipment and the serving radio base station to be compensated for, based on the determined gain of the user equipment towards the serving radio base station and the obtained gains;
configured to determine a second channel quality of the channel based on the estimated first channel quality, the determined fraction and the determined pathloss; and
configured to schedule a radio resource for the user equipment based on the determined second channel quality;
wherein said radio base station is configured to determine the fraction of the determined pathloss between the first user equipment and the serving radio base station according to $$\tau_s = \frac{\sum_{i=1}^{M_s} G_{i,s}}{\sum_{j=1}^{N}\sum_{i=1}^{M_s} G_{i,j}} * F,$$

where $G_{i,s}$ is said gain between said user equipment of interest i and said serving base station s; $M_s$ is a number of user equipments in the serving cell served by the serving base station; $G_{i,j}$ is said gain between the user equipment of interest i and the radio base stations j, including the serving base station s; N is the number of cells; and F is a preset fairness factor.

6. The radio base station of claim 5, wherein said radio base station is configured to obtain from the user equipment the gain of the user equipment and each of a number of neighboring radio base stations in a report comprising a received Reference Signal Received Power (RSRP) from each of the neighboring base stations.

7. The radio base station of claim 5, wherein said radio base station is configured to determine the fraction of the determined pathloss between the first user equipment and the serving radio base station, according to $$\tau_s^i, \tau_s^j = \frac{G_{i,s}}{\sum_{j=1}^{N} G_{i,j}} * F,$$

where $G_{i,s}$ is said gain between the user equipment of interest i and the serving base station s; $G_{i,j}$ is said gain between the user equipment of interest i and the radio base stations j, including the serving base station s; N is the number of cells; and F is a fairness factor.

8. The radio base station of claim 5, wherein the estimated first channel quality is a first gain to interference and noise ratio, $GINR_{est}$, of the channel used by the user equipment, and the second channel quality of the channel is a second gain to interference and noise ratio, $GINR_{comp}$, determined based on the estimated $GINR_{est}$, the determined fraction and the determined pathloss to be compensated for, according to:

$GINR_{comp} = GINR_{est} + \text{fraction} * \text{pathloss}.$

* * * * *